UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

MANUFACTURE OF SILICON CARBID.

No. 913,324.                Specification of Letters Patent.        Patented Feb. 23, 1909.

Application filed February 13, 1907. Serial No. 357,143.

*To all whom it may concern:*

Be it known that I, FRANK J. TONE, of Niagara Falls, Niagara county, New York, have invented a new and useful Improvement in the Manufacture of Silicon Carbid, of which the following is a specification.

My invention relates to the manufacture of silicon carbid, and especially refers to the making of silicon carbid in a dense, compacted form.

According to the well known method of manufacture of silicon carbid, a mixture of pulverized coke, sand, salt and sawdust, is subjected to great heat in an electric furnace. The resulting product is a loose aggregation of crystals of various sizes with a considerable proportion of interstices in the crystal mass.

I have discovered that if porous masses of silicon carbid be embedded in a body of silica and carbon, and the latter be heated to the temperature of formation of silicon carbid, preferably by passing the electric current through a central conducting core of carbon, the vapors of silicon and carbon or their compounds will build upon and in the mass of silicon carbid crystals, and will convert it into a dense compacted and non-porous state.

I am not able to state positively, the nature of the reaction, but attribute it to the reversibility of the reaction

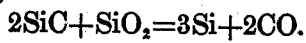

$$2SiC + SiO_2 = 3Si + 2CO.$$

I believe that silicon has the property of reducing CO at certain temperatures just below the decomposition temperature of silicon carbid and that the silicon carbid thus formed, is deposited in the pores of the crystalline mass, making a dense compacted form.

In the practice of my invention care should be taken not to carry the temperature to a point sufficiently high to decompose the resulting product and convert it into graphite.

I claim:—

1. The process of making dense silicon carbid which consists in heating a porous mass of crystalline silicon carbid in proximity to commingled vapors of substances containing carbon and silicon to a temperature sufficient to cause the carbon and silicon to combine throughout the pores of the silicon carbid mass.

2. As a new article of manufacture, dense compacted silicon carbid consisting of silicon carbid crystals united by and combined with interstitial silicon carbid.

In testimony whereof, I have hereunto set my hand.

FRANK J. TONE.

Witnesses:
    EDMUND S. SMITH,
    CHARLES CHORMANN.